United States Patent Office 3,210,340
Patented Oct. 5, 1965

3,210,340
2-METHYLENE-9α HALO-COMPOUNDS OF THE PREGNENE SERIES AND PROCESS TO MAKE SAME
Albert Bowers and John Edwards, both of Mexico City, Mexico, assignors to Syntex S.A., Mexico City, Mexico, a corporation of Mexico
No Drawing. Filed Apr. 13, 1962, Ser. No. 187,226
16 Claims. (Cl. 260—239.55)

The present invention relates to certain new cyclopentanophenanthrene derivatives and to the process for the production thereof.

More particularly the present invention relates to certain novel 2-methylene substituted cortical hormones, which may be also further substituted at C-6 by chlorine, fluorine or a methyl group and/or at C-16 by a methyl or a hydroxyl group, as well as to the cyclic acetals and ketals of the 16, 17-dihydroxy compounds.

The novel compounds of the present invention are potent cortical hormones having high anti-inflammatory, glucocorticoid, anti-estrogenic and anti-gonadotropic activities with low catabolic activity. The 16,17-ketals and acetals are particularly potent topical corticoids.

These compounds are represented by the following formulas:

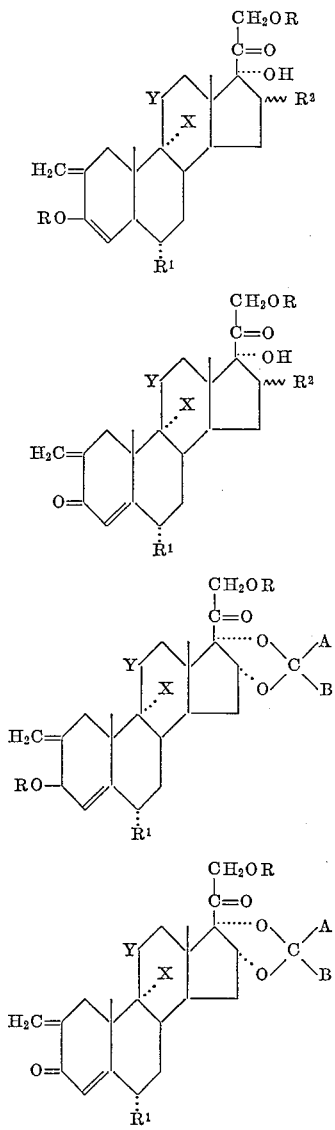

In the above formulas, R represents hydrogen or an acyl group derived from a hydrocarbon carboxylic acid of less than 12 carbon atoms; $R^1$ represents hydrogen, chlorine, fluorine or a methyl radical; $R^2$ represents hydrogen, α or β-methyl, or a free or esterified α-hydroxyl group; A represents hydrogen, a lower alkyl group, that is an alkyl radical of 1 to 8 carbon atoms, an aryl or lower aralkyl radical containing up to 8 carbon atoms or an heterocyclic monocyclic radical; B represents a lower alkyl, aryl or aralkyl radical containing up to 8 carbon atoms, a monocyclic heterocyclic radical or together A and B may represent a heterocyclic or homocyclic radical; Y represents β-hydroxy or keto and X represents hydrogen, chlorine or fluorine.

The acyl groups referred to above are derived from hydrocarbon carboxylic acids containing less than 12 carbon atoms which may be saturated or unsaturated, of straight, branched, cyclic or cyclicaliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate, and β-chloropropionate.

The method for producing the novel compounds of the present invention is illustrated in part by the following reaction sequence:

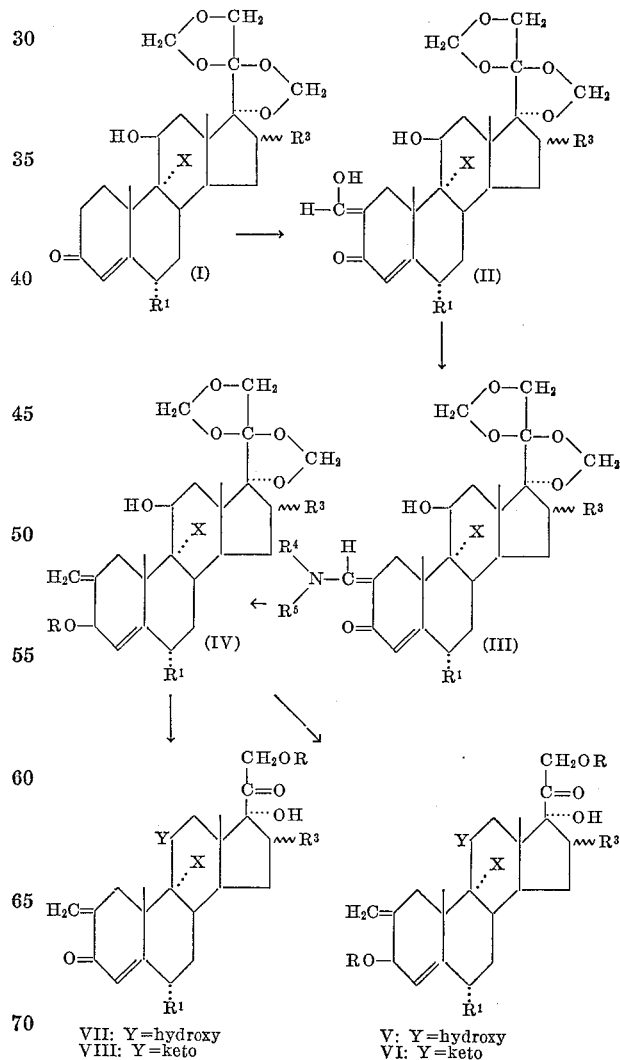

VII: Y=hydroxy
VIII: Y=keto

V: Y=hydroxy
VI: Y=keto

In the above equation R, R¹, X and Y have the same meaning as heretofore set forth; R³ represents hydrogen or a methyl group in α or β configuration and R⁴ and R⁵ represent hydrogen, lower alkyl or together with the nitrogen a heterocyclic group.

In practicing the process outlined above, the 17,20; 20,21-bismethylenedioxy derivative of hydrocortisone or of one of its derivatives substituted at C-6α by a chlorine, fluorine or a methyl group, at C-9α by chlorine, fluorine and/or at C-16 by a methyl group in α or β-configuration (I), is condensed with ethyl formate in benzene solution and in the presence of sodium hydride, in accordance with the method described by H. J. Ringold et al. in J. Am. Chem. Soc. 81, 427 (1959) to produce the corresponding 2-hydroxymethylene derivative (II) which is treated with an excess of a primary, secondary or tertiary amine, such as for example diethylamine, methylamine, piperidine, morpholine, pyrrolidine or the like, or with a saturated solution of ammonia in an inert organic solvent such as benzene or dioxane, to produce the aminomethylene compounds (III). The reaction is generally conducted at reflux temperature for a short period of time, in the order of 10 minutes to 1 hour. When a volatile amine is used, the condensation is effected in benzene solution, under pressure, for 1 to 2 hours. The reaction with a saturated solution of ammonia in dioxane is conducted at room temperature for a prolonged period of time, preferably during 72 hours.

Upon treatment of the 2-aminomethylene compounds with sodium borohydride or potassium borohydride in tetrahydrofuran solution, at reflux temperature during 6 to 8 hours, reduction occurs both at C-2 and C-3, with elimination of the amine, thus producing the 2-methylene-3β-hydroxy compounds (IV;R=H). The 3-hydroxy group may be then esterified in a conventional manner with acid anhydrides or chlorides of less than 12 carbon atoms in pyridine solution (IV;R=acyl).

The bismethylenedioxy group is then hydrolyzed by treatment with formic acid to regenerate the dihydroxy acetone side chain (V;R=H). There are thus produced Δ⁴-pregnene-3β,11β,17α,21-tetrol-20-one and the corresponding C-6, C-9 and C-16 substituted derivatives, which are in turn esterified at C-3 and C-21 with acid anhydrides or chlorides in pyridine solution (V; R=acyl). Oxidation of these diesters with chromic acid in acetic acid solution or with an 8 N solution of chromic acid in acetone give rise to the 11-keto compounds (VI; R=acyl) which after saponification with dilute potassium hydroxide in methanol solution produce the corresponding free compounds (VI; R=H).

When the 3-hydroxy-2-methylene compounds (IV; R=H) are oxidized with manganese dioxide in chloroform solution or with 2,3-dichloro-5,6-dicyano-1,4-benzoquinone in dioxane solution, the 3-hydroxyl group is converted into the corresponding ketone. The 17,20;20,21-bismethylenedioxy group is then hydrolyzed with 60% formic acid, thus producing 2-methylene hydrocortisone and the 6, 9- and/or 16-substituted derivatives thereof (VII; R=H), which upon treatment with acid anhydrides or chlorides of the type previously mentioned afford the corresponding 21-esters (VII; R=acyl).

When these esters are oxidized in a conventional manner, preferably with 8 N chromic acid in acetone solution, there are produced the corresponding 11-keto compounds i.e. 2-methylene cortisone 21-acetate as well as the 6, 9 and/or 16-substituted derivatives (VIII; R=acyl). Upon treatment of these esters with dilute alkali, there are produced the corresponding free compounds (VIII; R=H).

Alternatively, 2-methylene cortisone and the 6, 9 and/or 16-substituted derivatives (VIII; R=H) can be obtained by oxidation of the 3-hydroxy-2-methylene compounds (IV; R=H) with chromic acid followed by hydrolysis of the bismethylenedioxy group with formic acid.

The 2-methylene-16α-hydroxylated compounds object of the present invention are obtained by a method illustrated by the following equation:

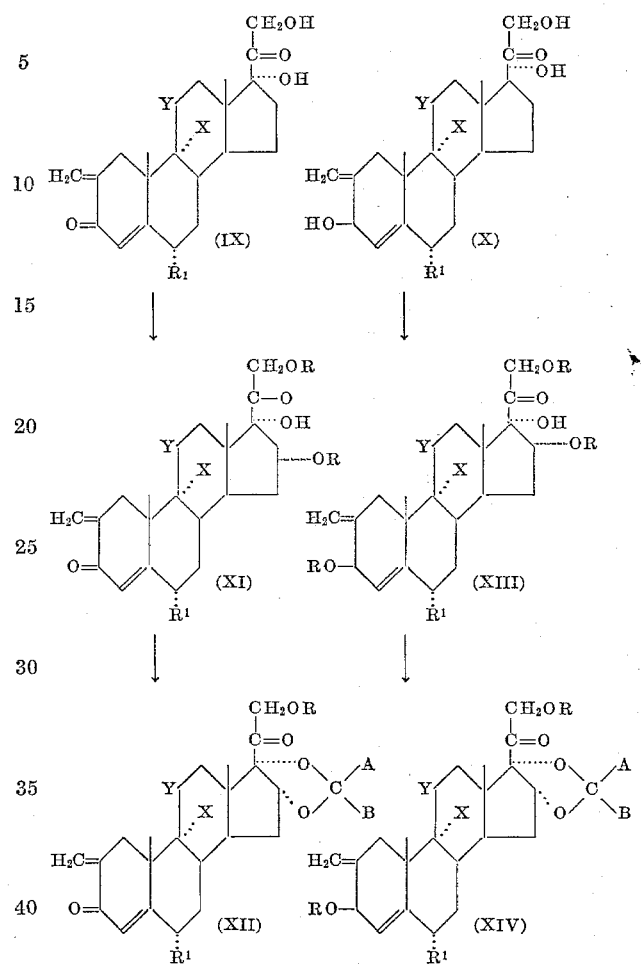

In the above formulas, X, Y, R, R¹, A and B have the same meaning as previously set forth.

In practicing the process set forth above, the 2-methylene-16α-hydroxy corticoids (XI and XIII; R=H) are obtained by microbiological hydroxylation of 2-methylene hydrocortisone, 2-methylene cortisone, 2-methylene-Δ⁴-pregnene-3β,11β17α,21-tetrol-20-one, 2-methylene-Δ⁴-pregnene-3β,17α,21-triol-11,20-dione or the corresponding 6 and/or 9-substituted derivatives thereof (IX and X). This microbiological hydroxylation is effected by incubation with a culture of a suitable strain of *Streptomyces roseochromogenus*, in accordance with the method described by J. S. Mills et al. in J. Am. Chem. Soc. 82, 3399 (1960).

Esterification of the thus obtained 16α-hydroxy compounds with acid anhydrides or chlorides of less than 12 carbon atoms in pyridine solution give rise to the 16,21-diesters or 3,16,21-triesters (XI and XIII; R=acyl).

By condensation of the 2-methylene-16α-hydroxy compounds with an aldehyde or a ketone, as for example benzaldehyde, acetone, methyl ethyl ketone, acetophenone or the like in the presence of an acid catalyst, such as perchloric acid, there are produced the corresponding 16,17-cyclic ketals or acetals (XII and XIV; R=H) which upon conventional esterification with an acylating agent of the type previously mentioned afford the 21-monoesters or the 3,21-diesters (XII and XIV; R=acyl).

The following examples serve to illustrate but are not intended to limit the scope of the present invention:

PREPARATION I

To a solution of 25 g. of 6α-fluorohydrocortisone in 800 cc. of chloroform were added 200 cc. of 37% aqueous formaldehyde and 25 cc. of concentrated hydrochloric acid and the mixture was stirred for 48 hours at room temperature. The two layers were separated; the aqueous layer was washed with chloroform and the combined organic solutions were washed with water to neutral, dried over anhydrous sodium sulfate and evaporated to dryness. The residue was recrystallized from methanol-ether thus affording 6α-fluoro-17,20;20,21-bismethylenedioxy-Δ$^4$-pregnen-11β-ol-3-one.

PREPARATION II

By following the method described in the preceding preparation, 6α-chloro-hydrocortisone, 6α-methylhydrocortisone, 6α,9α-difluoro-hydrocortisone, 6α-methyl-9α-fluoro-hydrocortisone, 6α,16α - dimethyl - hydrocortisone, 6α-fluoro-16α-methyl-hydrocortisone and 6α,9α-difluoro-16α-methyl-hydrocortisone were converted into the corresponding 17,20;20,21-bismethylenedioxy derivatives, namely 6α-chloro - 17,20;20,21 - bismethylenedioxy - Δ$^4$-pregnen-11β-ol-3-one; 6α-methyl-17,20;20,21 - bismethylenedioxy-Δ$^4$-pregnen-11β-ol-3-one; 6α,9α - difluoro-17,20; 20,21-bismethylenedioxy - Δ$^4$ - pregnen-11β-ol-3-one,6α-methyl - 9α - fluoro - 17,20;20,21 - bismethylenedioxy-Δ$^4$-pregnen-11β-ol-3-one, 6α,16α - dimethyl - 17,20;20,21-bismethylenedioxy-Δ$^4$-pregnen-11β-ol-3-one and 6α,9α-difluoro-16α-methyl - 17,20;20,21 - bismethylenedioxy-Δ$^4$-pregnen-11β-ol-3-one.

*Example I*

To a solution of 15 g. of 17,20;20,21-bismethylenedioxy-Δ$^4$-pregnen-11β-ol-3-one in 300 cc. of anhydrous benzene was added 15 cc. of ethyl formate and 6.5 g. of sodium hydride, while cooling and stirring under an atmosphere of nitrogen. The mixture was stirred for 24 hours at room temperature, hexane was added until complete precipitation, the solid was collected and dried under vacuum. The crude material was suspended in aqueous hydrochloric acid and stirred at room temperature for half an hour. The precipitate was collected, washed with water and dried. Recrystallization from methylene - chloride - hexane gave 2-hydroxymethylene-17,20;20,21-bismethylenedioxy-Δ$^4$-pregnen-11β-ol-3-one.

A solution of 5 g. of the above compound in 250 cc. of benzene, thiophene free was refluxed for 1 hour with 5 cc. of piperidine. The solvent was removed under vacuo and the residue was purified by recrystallization from acetone-hexane thus yielding 2-piperidylmethylene, 17,20;20,21-bismethylenedioxy-Δ$^4$-pregnen-11β-ol-3-one.

To a solution of 3 g. of the preceding compound in 60 cc. of tetrahydrofuran there was added a solution of 3 g. of sodium borohydride in 6 cc. of water and the mixture was then refluxed during 6 hours. The excess of reagent was destroyed by careful addition of 5 cc. of acetic acid and the solvents were removed under reduced pressure. The residue was dissolved in methylene chloride and the resulting solution washed to neutral, dried over anhydrous sodium sulfate and evaporated to dryness. Crystallization of the residue from acetone-ether gave 2-methylene-17,20;20,21-bismethylenedioxy-Δ$^4$-pregnene-3β,11β-diol.

*Example II*

A solution of 2 g. of 2-methylene-17,20;20,21-bismethylenedioxy-Δ$^4$-pregnene-3β,11β-diol in 8 cc. of pyridine was treated with 4 cc. of acetic anhydride and then heated on the steam bath for 1 hour. The mixture was then poured into ice water and the formed precipitate collected, washed with water and dried. Recrystallization from methylene chloride-hexane afforded 2-methylene-17,20;20,21 - bismethylenedioxy - Δ$^4$ - pregnene - 3β,11β-diol-3-acetate.

2 g. of the preceding bismethylenedioxy derivative were heated on the steam bath with 40 cc. of 60% formic acid for 1 hour, cooled, diluted with water and the precipitate was collected, washed with water, dried, and recrystallized from acetone-hexane, thus producing 2-methylene - Δ$^4$ - pregnene - 3β,11β,17α,21 - tetrol-20-one 3-monoacetate.

A mixture of 1 g. of the above compound, 4 cc. of pyridine and 2 cc. of propionic anhydride was kept at room temperature overnight, poured into ice water, the formed precipitate was filtered, washed with water and dried. Crystallization from acetone-hexane gave 2-methylene - Δ$^4$ - pregnene-3β,11β,17α,21-tetrol-20-one 3-acetate 21-propionate.

*Example III*

A solution of 1 g. of 2-methylene-17,20;20,21-bismethylenedioxy-Δ$^4$-pregnene-3β,11β-diol in 100 cc. of chloroform, distilled from calcium chloride was oxidized by stirring for 18 hours at room temperature with 10 g. of freshly precipitated manganese dioxide. The inorganic material was filtered, washed with hot chloroform and the solution evaporated. Recrystallization from acetone-hexane gave 2-methylene-17,20;20,21-bismethylenedioxy-Δ$^4$-pregnen-11β-ol-3-one.

The above compound was hydrolyzed with 60% formic acid, in accordance with the method of the preceding example, thus producing 2-methylene-Δ$^4$-pregnene-11β, 17α,21-triol-3,20-dione, which upon esterification with acetic, propionic and cyclopentylpropionic anhydrides in pyridine solution, by following the esterification method of the preceding example gave the 21-acetate, 21-propionate and 21-cyclopentylpropionate of 2-methylene-hydrocortisone.

*Example IV*

A solution of 1 g. of the acetate of 2-methylene-hydrocortisone in 20 cc. of acetone was cooled to 0° C. and treated under an atmosphere of nitrogen and with stirring, with a solution of 8 N chromic acid (prepared by mixing 26 g. of chromium trioxide with 23 cc. of concentrated sulfuric acid and diluting with water to 100 cc.), until the color of the reagent persisted in the mixture. It was stirred for 5 minutes further at 0–5° C. and diluted with water. The precipitate was collected, washed with water and dried under vacuum, thus affording a crude product which upon recrystallization from acetone-hexane gave the 21-acetate of 2-methylene-cortisone.

*Example V*

Examples I and II were repeated but using as starting material 10 g. of 17,20;20,21-bismethylenedioxy-9α-chloro-Δ$^4$-pregnen-11β-ol-3-one (described in U.S. Patent No. 2,888,456); there were thus obtained 2-piperidylmethylene - 17,20;20,21 - bismethylenedioxy-9α-chloro-Δ$^4$-pregnen-11β-ol-3-one; 2-methylene-17,20;20,21-bismethylenedioxy-9α-chloro-Δ$^4$-pregnene-3β,11β-diol, 2-methylene-17,20;20,21 - bismethylenedioxy - 9α-chloro-Δ$^4$-pregnene-3β,11β-diol 3-acetate, 2-methylene-9α-chloro-Δ$^4$-pregnene-3β,11β,17α,21-tetrol-20-one-3-monoacetate and 2-methylene-9α-chloro-Δ$^4$-pregnene-3β,11β,17α,21-tetrol-20-one 3-acetate-21-propionate.

*Example VI*

By following the methods described in Examples I and III, 10 g. of 17,20;20,21-bismethylenedioxy-9α-fluoro-Δ$^4$-pregnen-11β-ol-3-one, described in U.S. Patent No. 2,888,456 were converted successively into 2-piperidylmethylene - 17,20;20,21 - bismethylenedioxy-9α-fluoro-Δ$^4$-pregnen-11β-ol-3-one, 2-methylene-17,20;20,21-bismethylenedioxy-9α-fluoro-Δ$^4$-pregnene-3β,11β-diol, 2-methylene-17,20;20,21 - bismethylenedioxy-Δ$^4$-pregnen-11β-ol-3-one, 2-methylene-9α-fluoro-hydrocortisone and its acetate.

*Example VII*

By following the method described in Example I 10 g. of 16α-methyl-17,20;20,21-bismethylenedioxy-Δ$^4$-pregnen-11β-ol-3-one obtained as described in U.S. Patent No. 2,888,457 were condensed with ethyl formate in benzene solution and in the presence of sodium hydride, to produce 2-hydroxymethylene-16α-methyl-17,20;20,21-bismethlenedioxy-Δ⁴-pregnen-11β-ol-3-one.

A mixture of 5 g. of the above compound 10 g. of dimethylamine and 80 cc. of benzene was heated in a sealed tube for half an hours at 75° C. The reaction mixture was then washed with water, dried over anhydrous sodium sulfate and evaporated to dryness under reduced pressure. The residue was chromatographed on neutral alumina, thus giving 2-dimethylaminomethylene-16α-methyl - 17,20;20,21 - bismethylenedioxy-Δ⁴-pregnen-11β-ol-3-one.

Upon reduction of the above compound with sodium borohydride in tetrahydrofuran solution in accordance with the method of Example I, followed by oxidation of the 2-methylene-16α-methyl-17,20;20,21-bismethylenedioxy-Δ⁴-pregnene-3β,11β-diol with manganese dioxide and hydrolysis of the bismethylenedioxy group with 60% formic acid, there was produced 2-methylene-16α-methyl-hydrocortisone.

*Example VIII*

A mixture of 2 g. of 2-methylene-16α-methyl-hydrocortisone, 10 cc. of pyridine and 6 cc. of propionic anhydride was kept at room temperature during 4 hours. It was then poured into water and the formed precipitate collected by filtration, thus producing the propionate of 2-methylene-16α-methyl-hydrocortisone.

A solution of 1.1 equivalents of chromic acid in 5 cc. of 80% acetic acid was added dropwise to a stirred solution of 1 g. of the above propionate in 10 cc. of glacial acetic acid, while the temperature was maintained around 20° C. After 2 hours at room temperature, the mixture was poured into ice water and the formed precipitate collected, washed with water and recrystallized from methanol, thus giving the propionate of 2-methylene-16α-methyl-cortisone.

A solution of 1 g. of the foregoing compound in 50 cc. of methanol and treated with 5 cc. of a 4% aqueous solution of potassium hydroxide and the reaction mixture was stirred for 1 hour under an atmosphere of nitrogen at 0° C; the mixture was neutralized with acetic acid and the methanol distilled under reduced pressure. The residue was triturated with water and the solid collected, washed with water, dried and recrystallized from ethyl acetate-methanol, thus producing 2-methylene-16α-methyl cortisone.

*Example IX*

Examples VII and VIII were repeated but using as starting material 17,20;20,21 - bismethylenedioxy - 16β - methyl-Δ⁴-pregnen-11β-ol-3-one, producing as final products 2-methylene-16β-methyl-hydrocortisone and 2-methylene-16β-methyl-cortisone.

*Example X*

By following the method of Example I, 10 g. of 6α-chloro-17,20;20,21-bismethylenedioxy-Δ⁴-pregnen - 11β - ol-3-one were condensed with ethyl formate in benzene solution and in the presence of sodium hydride, to produce 2-hydroxymethylene-6α-chloro-17,20;20,21-bismethylenedioxy-Δ⁴-pregnen-11β-ol-3-one.

A mixture of 10 g. of the foregoing compound, 500 cc. of benzene and 25 cc. of morpholine was refluxed for 15 minutes; it was then evaporated to dryness under reduced pressure and the residue, consisting of the crude 2-morpholinylmethylene-6α-chloro-17,20;20,21 - bismethylenedioxy-Δ⁴-pregnen-11β-ol-3-one was in turn reduced with sodium borohydride in tetrahydrofuran solution, to produce 2 - methylene-6α-chloro-17,20;20,21-bismethylenedioxy-Δ⁴-pregnene-3β,11β-diol.

A mixture of 1 g. of the latter compound, 4 cc. of pyridine and 2 cc. of benzoyl chloride was heated on the steambath for 1 hour and then poured into ice water; the formed precipitate was filtered, washed with water and dried. Crystallization from acetone-hexane gave 2-methylene-6α-chloro-17,20;20,21-bismethylenedioxy - Δ⁴ - pregnene-3β,11β-diol-3-benzoate.

Upon hydrolysis of the above compound with 60% formic acid followed by esterification of C-21 with acetic anhydride in pyridine solution, in accordance with the method of Example II there was produced 2-methylene-6α-chloro-Δ⁴-pregnene-3β,11β,17α-21-tetrol - 20 - one - 3 - benzoate-21-acetate.

*Example XI*

10 g. of 6α-methyl-17,20;20,21 bismethylenedioxy-Δ⁴-pregnen-11β-ol-3-one were condensed with ethyl formate in benzene solution and in the presence of sodium hydride and the resulting 2-hydroxymethylene derivative refluxed with morpholine in benzene solution, in accordance with the method of the preceding example, to give the morpholinylmethylene - 6α - methyl - 17,20;20,21-bismethylenedioxy-Δ⁴-pregnen-11β-ol-3-one.

The foregoing compound was then reduced with sodium borohydride in tetrahydrofuran solution, by following the method of Example I, thus producing 2-methylene-6α-methyl-17,20;20,21-bismethylenedioxy - Δ⁴ - pregnene-3β,11β-diol.

A mixture of 5 g. of the above compound in 100 cc. of dioxane, and 1.1 molar equivalents of 2,3-dichloro, 5,6-dicyano 1,4-benzoquinone was stirred and kept at room temperature for 3 hours. The hydroquinone formed during the reaction was filtered off, and the filtrate evaporated to dryness. The residue was dissolved in acetone and filtered through 100 g. of alumina. Crystallization from acetone hexane gave 2-methylene-6α-methyl-17,20;20,21-bismethylenedioxy-Δ⁴-pregnen-11β-ol-3-one.

The bismethylenedioxy group was then hydrolyzed with formic acid, in accordance with the method of Example II thus yielding 2-methylene-6α-methyl-hydrocortisone.

Upon esterification of the above compound with acetic, caproic and undecenoic anhydrides in pyridine solution, there were produced the 21-acetate, 21-caproate and 21-undecenoate of 2-methylene-6α-methyl hydrocortisone.

In a similar manner, starting from the bismethylenedioxy derivative of 6α-methyl-9α-fluoro-hydrocortisone there were produced as final products 2-methylene-6α-methyl-9α-fluoro-hydrocortisone and the corresponding esters.

*Example XII*

A mixture of 7 g. of 2-hydroxymethylene-6α-chloro-17,20;20,21-bismethylenedioxy-Δ⁴-pregnen - 11β - ol - 3 - one obtained as described in Example III and 200 cc. of dioxane saturated with ammonia was stirred at room temperature for 72 hours. It was then concentrated to a small volume under reduced pressure, diluted with water and the formed precipitate collected by filtration. Recrystallization from acetone-ether gave the pure 2-aminomethylene-6α-chloro-17,20;20,21-bismethylenedioxy - Δ⁴ - pregnen-11β-ol-3-one.

Reduction of the foregoing compound with sodium borohydride in tetrahydrofuran solution gave 2-methylene-6α-chloro-17,20;20,21-bismethylenedioxy - Δ⁴ - pregnene-3β,11β-diol identical to that obtained in Example X.

The above compound was then oxidized with manganese dioxide in chloroform solution, by following the method of Example III, to produce 2-methylene-6α-chloro-17,20;20,21-bismethylenedioxy-Δ⁴-pregnen - 11β - ol - 3-one. Hydrolysis of the bismethylenedioxy group with 60% formic acid followed by esterification with acetic and propionic anhydride in pyridene solution gave 2-methylene-6α-chloro-hydrocortisone and its 21-acetate and propionate.

*Example XIII*

By following the methods of Examples I and III, 6α,16α - dimethyl - 17,20;20,21 - bismethylenedioxy-Δ⁴-pregnen-11β-ol-3-one and 6α-fluoro-16α-methyl-17,20;20,21-bismethylenedioxy-Δ⁴-pregnen-11β-ol-3-one were converted respectively into 2-methylene-6α,16α-dimethyl-hydrocortisone and 2-methylene-6α-fluoro-16α-methyl hydrocortisone.

Esterification of the above compounds with acetic anhydride in pyridine solution gave the corresponding acetates.

*Example XIV*

5 g. of 6α,9α-difluoro-17,20;20,21-bismethylenedioxy-Δ⁴-pregnen-11β-ol-3-one were condensed with ethyl formate in benzene solution and in the presence of sodium hydride, by following the method of Example I, to produce 2 - hydroxymethylene - 6α,9α-difluoro - 17,20;20,21-bismethylenedioxy-Δ⁴-pregnen-11β-ol-3-one.

The foregoing compound was then treated with dioxane saturated with ammonia in accordance with the method of Example XII and the resulting 2-aminomethylene derivative reduced with sodium borohydride in tetrahydrofuran solution, to produce 2-methylene-6α,9α-difluoro-17,20;20,21-bismethylenedioxy-Δ⁴-pregnene-3β-11β-diol.

Upon oxidation of the latter compound with 2,3-dichloro, 5,6-dicyano-1,4-benzoquinone in accordance with the method of Example XI, followed by hydrolysis of the bismethylenedioxy group with 60% formic acid there was produced 2 - methylene-6α,9α - difluoro - hydrocortisone which in turn was esterified with cyclopentylpropionic anhydride in pyridine solution, thus producing the 21-cyclopentylpropionate of 2 - methylene-6α,9α-difluoro-hydrocortisone.

*Example XV*

By following the method of Example I, 6α,9α-difluoro-16α - methyl - 17,20;20,21-bismethylenedioxy-Δ⁴-pregnen-11β-ol-3-one was converted successively into the 2-hydroxymethylene derivative, 2-piperidylmethylene-6α,9α-difluoro - 16α - methyl - 17,20;20,21 - bismethylenedioxy-Δ⁴-pregnen - 11β-ol-3-one, and 2-methylene-6α,9α-difluoro-16α - methyl-17,20;20,21-bismethylenedioxy-Δ⁴-pregnene-3β,11β-diol.

Hydrolysis of the methylenedioxy group followed by esterification with acetic anhydride in pyridine solution gave 2 - methylene - 6α,9α - difluoro-16α-methyl-Δ⁴-pregnene-3β,11β,17α-21-tetrol-20-one-3,21-diacetate.

*Example XVI*

A stirred solution of 1 g. of 2-methylene-6α,9α-difluoro-16α - methyl-17,20;20,21-bismethylenedioxy-Δ⁴-pregnene-3β,11β-diol in 25 cc. of acetone was treated with an 8 N solution of chromic-acid in acetone solution until the color of the reagent persisted in the mixture. It was then diluted with water and the formed precipitate collected by filtration. The crude 3,11-diketone thus obtained was hydrolyzed with 60% formic acid, to produce 2-methylene-6α,9α-difluoro-16α-methyl-cortisone.

Upon esterification of the above compound with acetic and caproic anhydrides in pyridine solution there were produced the 21-acetate and caproate of 2-methylene-6α,9α-difluoro-16α-methyl-cortisone.

In a similar manner 2-methylene-9α-chloro-17,20;20,21-bismethylenedioxy-Δ⁴-pregnene-3β,11β-diol, 2-methylene-6α - methyl - 17,20;20,21-bismethylenedioxy-Δ⁴-pregnene-3β,11β-diol and 2-methylene-6α,9α-difluoro-17,20;20,21-bismethylenedioxy-Δ⁴-pregnene-3β,11β-diol were converted respectively into 2-methylene-9α-chloro-cortisone, 2-methylene-6α-methyl cortisone and 2-methylene 6α,9α-difluoro cortisone as well as the corresponding acetates and caproates.

*Example XVII*

A culture of *Streptomyces roseochromogenus* ATCC 3347 was prepared in an inclined agar medium containing 1% of glucose and 1% of yeast extract. 1 cc. of a suspension of this culture was then used to inoculate each one of a series of 250 cc. flasks containing 50 cc. of a sterilized aqueous medium of 2% peptone and 5% corn syrup, the mixtures were then incubated in a shaking machine at 28° C. under aeration for a period 24–48 hours. There was thus obtained a vegetating growing culture of *Streptomyces roseochromogenus* which was used for the subsequent incubation of the steroid.

10 mg. of 2-methylene hydrocortisone were added to each 50 cc. of the vegetating culture of *Streptomyces roseochromogenus*, obtained as described above. The mixture was stirred for 48–72 hours with aeration and then extracted several times with methylene dichloride. The extract was washed with water, dried over anhydrous sodium sulfate, filtered and evaporated under reduced pressure.

The residue was purified by chromatography on silica gel thus giving 2-methylene-16α-hydroxy-hydrocortisone.

500 mg. of the above compound were esterified with propionic anhydride in pyridine solution, thus producing the 16,21-dipropionate of 2-methylene-Δ⁴-pregnen-11β,16α,17α,21-tetrol-3,20-dione.

*Example XVIII*

By following the incubation method of the preceding example 500 mg. of 2-methylene-Δ⁴-pregnene-3β,11β,17α,21-tetrol-20-one, obtained by hydrolysis of the bismethylenedioxy group in 2-methylene-17,20;20,21-bismethylenedioxy-Δ⁴-pregnene-3β,11β-diol with 60% formic acid were converted into 2-methylene-Δ⁴-pregnene-3β,11β,16α,17α-21-pentol-20-one. Upon esterification of this compound with acetic anhydride in pyridine solution there was produced the 3,16,21-*triacetate*.

*Example XIX*

By following the method of Example XVII, 1 g. of 2-methylene-9α-fluoro-hydrocortisone was incubated with a culture of *Streptomyces roseochromogenus* ATCC 3347 thus producing 2-methylene-9α-fluoro-16α-hydroxyhydrocortisone.

A stirred suspension of 600 mg. of the latter compound in 20 cc. of acetone was treated with 0.2 cc. of 70% perchloric acid. The stirring was continued until the steroid entered into solution and then for 30 minutes further at room temperature, the solution was poured into 5% aqueous sodium bicarbonate solution and the precipitate was collected by filtration washed with water and dried. There was thus obtained 2-methylene-9α-fluoro-16α,17α-isopropylidenedioxy - Δ⁴ - pregnene - 11β,21 - diol - 3,20-dione, that was purified by recrystallization from acetone-ether.

Treatment of the above compound with acetic, caproic and cyclopentylpropionic anhydride in pyridine solution gave the corresponding esters.

*Example XX*

By following the method of Example XVII, the compounds listed below under I were incubated with *Streptomyces roseochromogenus* ATCC 3347 thus giving the 16α-hydroxy derivatives II.

| I | II |
|---|---|
| 2-methylene-6α-methyl-9α-fluoro-hydrocortisone. | 2-methylene-6α-methyl-9α-fluoro-16α-hydroxy-hydrocortisone. |
| 2-methylene-6α-chloro-hydrocortisone. | 2-methylene-6α-chloro-16α-hydroxy-hydrocortisone. |
| 2-methylene-6α,9α-difluoro-hydrocortisone. | 2-methylene-6α,9α-difluoro-16α-hydroxy-hydrocortisone. |
| 2-methylene-9α-chloro-cortisone. | 2-methylene19α-chloro-16α-hydroxy-cortisone. |
| 2-methylene-6α-methyl-cortisone. | 2-methylene-6α-methyl-16α-hydroxy-cortisone. |

*Example XXI*

A mixture of 1 g. of 2-methylene-6α-methyl-16α-hydroxy-cortisone 50 cc. of freshly distilled acetophenone and 0.5 cc. of 72% perchloric acid was stirred at room temperature for 1 hour. The resulting mixture was washed with sodium bicarbonate solution and with water to neutrality, then it was steam distilled and the product extracted with methylene chloride. The extract was dried over anhydrous sodium sulfate and evaporated to dryness. Crystallization from acetone-hexane yielded the 16,17-acetophenonide of 2-methylene-6α-methyl-16α-hydroxy cortisone, which was esterified with acetic anhydride in pyridine solution to produce the corresponding 21-acetate.

*Example XXII*

By following the method of Example XIX, 500 mg. of 2 - methylene - 6α,9α - difluoro - 16α - hydroxy - hydrocortisone were treated with acetone in the presence of 70% perchloric acid, to produce 2-methylene-6α,9α-difluoro - 16α,17α - isopropylidenedioxy - Δ⁴ - pregnene-11β, 21-diol-3,20-dione.

The foregoing compound was esterified with acetic anhydride in pyridine solution and the resulting 21-acetate was in turn oxidized with an 8 N chromium trioxide in acetone solution, thus affording the acetate of 2-methylene-6α,9α - difluoro - 16α,17α - isopropylidenedioxy - Δ⁴ - pregnen-21-ol-3,11,20-trione.

*Example XXIII*

By following the method of Example XIX 2-methylene-Δ⁴-pregnene-3β,11β,16α,17α,21-pentol-20-one, 2-methylene - 16α - hydroxy - hydrocortisone and 2 - methylene-6α-methyl-16α-hydroxy cortisone were treated with acetone in the presence of perchloric acid, thus producing respectively 2-methylene-16α,17α-isopropylidenedioxy-Δ⁴-pregnene-3β,11β,21-triol-20-one, 2-methylene-16α,17α-isopropylidenedioxy-Δ⁴-pregnene-11β,21-diol-3,20-dione and 2-methylene - 6α - methyl - 16α,17α - isopropylidenedioxy-Δ⁴-pregnen-21-ol-3,11,20-trione.

*Example XXIV*

A mixture of 1 g. of 2-methylene-17,20;20,21-bismethylenedioxy-Δ⁴-pregnene-3β,11β-diol and 20 cc. of 60% formic acid was heated on the steam bath for 30 minutes. Water was then added and the formed precipitate collected by filtration, to afford 2-methylene-Δ⁴-pregnene-3β,11β,17α,21-tetrol-20-one.

*Example XXV*

By following the oxidation method of Example III, 1 g. of 2-methylene-6α,9α-difluoro-16α-methyl-17,20;20,21-bismethylenedioxy-Δ⁴-pregnene-3β,11β-diol, intermediate of Example XV was converted into 2-methylene-6α,9α-difluoro - 16α - methyl - 17,20;20,21 - bismethylenedioxy-Δ⁴-pregnen-11β-ol-3-one. Upon treatment of the above compound with formic acid, by following the method of the preceding example, there was obtained 2-methylene-6α,9α-difluoro-16α-methyl-hydrocortisone.

*Example XXVI*

5 g. of 17,20;20,21-bismethylenedioxy-6α-fluoro-16α-methyl-Δ⁴-pregnen-11β-ol-3-one were condensed with ethyl formate in the presence of sodium hydride, by following the method of Example I, to produce 2-hydroxymethylene-17,20;20,21-bismethylenedioxy-6α-fluoro-16α - methyl-Δ⁴-pregnen-11β-ol-3-one.

The foregoing compound was then treated with dioxane saturated with ammonia in accordance with the method of Example XII and the resulting 2-aminomethylene derivative reduced with sodium borohydride in tetrahydrofuran solution, to produce 2-methylene-6α-fluoro-16α-methyl-17,20;20,21-bismethylenedioxy-Δ⁴-pregnene - 3β, 11β-diol.

After hydrolysis of the bismethylenedioxy group with 60% formic acid there was produced 2-methylene-6α-fluoro-16α-methyl-Δ⁴-pregnene-3β,11β,17α,21-tetrol - 20 - one which upon esterification with acetic anhydride in pyridine solution gave 2-methylene-6α-fluoro-16α-methyl-Δ⁴-pregnene-3β,17α,21-tetrol-20-one 3,21-diacetate.

We claim:
1. A compound of the following formula:

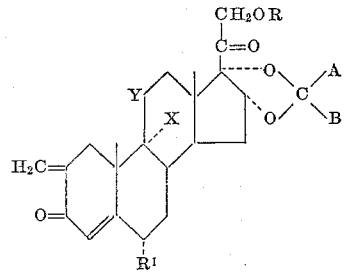

wherein R is selected from the group consisting of hydrogen and an hydrocarbon carboxylic acyl radical of less than 12 carbon atoms; $R^1$ is selected from the group consisting of hydrogen, chlorine, fluorine and methyl; A is selected from the group consisting of hydrogen and a lower alkyl, aryl and aralkyl radical containing up to 8 carbon atoms; B is selected from the group consisting of an alkyl, aryl and aralkyl radical containing up to 8 carbon atoms; X is selected from the group consisting of hydrogen, chlorine and fluorine and Y is selected from the group consisting of β-hydroxy and keto.

2. 2-methylene-6α,9α-difluoro-hydrocortisone.
3. 2-methylene-6α,9α-difluoro-16α-methyl - hydrocortisone.
4. 2-methylene-16α-hydroxy-hydrocortisone.
5. 2 - methylene-9α-fluoro-16α,17α - isopropylidenedioxy-Δ⁴-pregnene-11β,21-diol-3,20-dione.
6. 2-methylene-6α-methyl-cortisone.
7. 2-methylene-6α,9α-difluoro-cortisone.
8. 2 - methylene-6α,9α-difluoro-16α,17α - isopropylidenedioxy-Δ⁴-pregnene-21-ol-3,11,20-trione.

9. A compound selected from the group consisting of those of the following formulas:

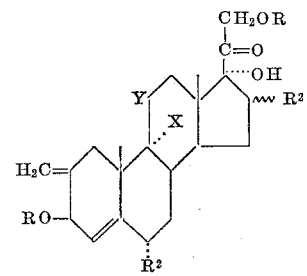

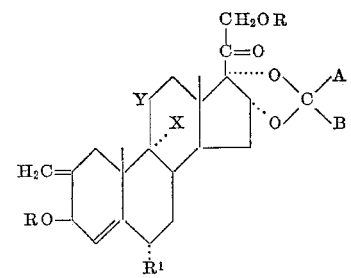

wherein R is selected from the group consisting of hydrogen and an hydrocarbon carboxylic acyl radical of less than 12 carbon atoms; $R^1$ is selected from the group consisting of hydrogen, chlorine, fluorine and methyl; $R^2$ is selected from the group consisting of hydrogen, α-methyl, β-methyl, α-hydroxy and an α-hydrocarbon carboxylic acyloxy radical of less than 12 carbon atoms; A is selected from the group consisting of hydrogen and a lower alkyl, aryl and aralkyl radical containing up to 8 carbon atoms; B is selected from the group consisting of an alkyl, aryl and aralkyl radical containing up to 8 carbon atoms; X is selected from the group consisting of hydrogen, chlorine and fluorine and Y is selected from the group consisting of β-hydroxy and keto.

10. 2 - methylene-Δ⁴-pregnene-3β,11β,17α,21 - tetrol - 20-one.

11. 2 - methylene-Δ⁴-pregnene - 3β,11β,16α,17α,21 - pentol-20-one.

12. 2 - methylene - 6α,9α-difluoro-16α-methyl-Δ⁴-pregnene-3β,11β,17α,21-tetrol-20-one-3,21-diacetate.

13. 2 - methylene - 16α,17α-isopropylidenedioxy-Δ⁴ - pregnene-3β,11β,21-triol-20-one.

14. In the process for making 2-methylene corticoids, the step which comprises the reduction of a 2-aminomethylene-17,20;20,21-bismethylenedioxy-Δ⁴-3-keto compound of the corticoid series with sodium borohydride.

15. A compound of the following formula:

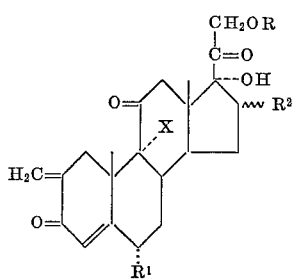

wherein R is selected from the group consisting of hydrogen and an hydrocarbon carboxylic acyl radical of less than 12 carbon atoms; $R^1$ is selected from the group consisting of hydrogen, chlorine, fluorine and methyl; X is selected from the group consisting of hydrogen, chlorine and fluorine and $R^2$ is selected from the group consisting of hydrogen, α-methyl, β-methyl, α-hydroxy and an α-hydrocarbon carboxylic acyloxy radical of less than 12 carbon atoms.

16. A compound of the following formula:

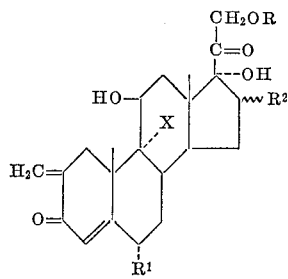

wherein R is selected from the group consisting of hydrogen and an hydrocarbon carboxylic acyl radical of less than 12 carbon atoms; $R^1$ is selected from the group consisting of hydrogen, chlorine, fluorine and methyl; X is selected from the group consisting of hydrogen, chlorine and fluorine and $R^2$ is selected from the group consisting of hydrogen, α-methyl, β-methyl, α-hydroxy and an α-hydrocarbon carboxylic acyloxy radical of less than 12 carbon atoms and when $R^1$ is hydrogen, $R^2$ is selected from the group consisting of α-hydroxy and α-hydrocarbon carboxylic acyloxy of less than 12 carbon atoms, and when $R^1$ is methyl, $R^2$ is other than hydrogen.

References Cited by the Examiner

UNITED STATES PATENTS 2,847,430   8/58   Beal _____ 260—397.45
2,880,130   3/59   Johnson _____ 167—65

OTHER REFERENCES

Fried et al.: "Recent Progress in Hormone Research," volume XI, 1955 (pages 167–174 relied on).

Ringold et al.: J.A.C.S. 80, 1958 (pages 6464 and 6465 relied on).

Selye: "Textbook of Endocrinology," 1947 (page 71 relied on).

LEWIS GOTTS, *Primary Examiner.*

IRVING MARCUS, *Examiner.*